(12) United States Patent
Small et al.

(10) Patent No.: US 12,272,850 B2
(45) Date of Patent: Apr. 8, 2025

(54) MEDIATED METAL-SULFUR FLOW BATTERY FOR GRID-SCALE ENERGY STORAGE

(71) Applicant: National Technology & Engineering Solutions of Sandia, LLC, Albuquerque, NM (US)

(72) Inventors: Leo J. Small, Albuquerque, NM (US); Melissa Lynn Meyerson, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 443 days.

(21) Appl. No.: 17/740,128

(22) Filed: May 9, 2022

(65) Prior Publication Data

US 2023/0033611 A1 Feb. 2, 2023

Related U.S. Application Data

(60) Provisional application No. 63/224,151, filed on Jul. 21, 2021.

(51) Int. Cl.
| | |
|---|---|
| *H01M 8/18* | (2006.01) |
| *H01M 4/36* | (2006.01) |
| *H01M 4/38* | (2006.01) |
| *H01M 4/62* | (2006.01) |
| *H01M 4/96* | (2006.01) |
| *H01M 12/08* | (2006.01) |
| *H01M 4/04* | (2006.01) |

(52) U.S. Cl.
CPC ........... *H01M 8/188* (2013.01); *H01M 4/366* (2013.01); *H01M 4/381* (2013.01); *H01M 4/382* (2013.01); *H01M 4/62* (2013.01); *H01M 4/96* (2013.01); *H01M 12/08* (2013.01); *H01M 4/0445* (2013.01)

(58) Field of Classification Search
CPC .................................................. H01M 4/366
See application file for complete search history.

(56) References Cited

PUBLICATIONS

Meini, S. et al., "The Use of Redox Mediators for Enhancing Utilization of $Li_2S$ Cathodes for Advanced Li-Battery Systems," Journal of Physical Chemistry Letters, 2014, vol. 5, pp. 915-918.
Yu, J. et al., "Redox Targeting-Based Aqueous Redox Flow Lithium Battery," ACS Energy Letters, 2018, vol. 3, pp. 2314-2320.

(Continued)

*Primary Examiner* — Laura Weiner
(74) *Attorney, Agent, or Firm* — Kevin W. Bieg

(57) ABSTRACT

The invention is directed to a mediated metal-sulfur flow battery. This battery format that is readily scalable to grid-scale levels at low cost, while maintaining battery safety by physically separating the anode and cathode. As an example, the marriage of a redox-targeting scheme to an engineered Li solid electrolyte interphase (SEI) enables a scalable, high efficiency, membrane-less Li—S redox flow battery. Redox mediators can be sued to kick-start the initial reduction of solid S into soluble polysulfides on the cathode side and final reduction of polysulfides into solid $Li_2S$, precluding the need for conductive carbons. On the anode side, a LiI and $LiNO_3$ pretreatment and additive strategy encourages a stable SEI and lessens capacity fade, avoiding the need for ion-selective separators.

13 Claims, 12 Drawing Sheets

(56) References Cited

PUBLICATIONS

Li, Z. et al., "Air-Breathing Aqueous Sulfur Flow Battery for Ultralow-Cost Long-Duration Electrical Storage," Joule, 2017, vol. 1, pp. 306-327.

Self, E. C. et al., "Ambient Temperature Sodium Polysulfide Catholyte for Nonaqueous Redox Flow Batteries," Journal of The Electrochemical Society, 2021, vol. 168, 080540, 7 pages.

Gross, M. M. and Manthiram, A., "Rechargeable Zinc-Aqueous Polysulfide Battery with a Mediator-Ion Solid Electrolyte," ACS Applied Materials & Interfaces, 2018, vol. 10, pp. 10612-10617.

Gross, M. M. and Manthiram, A., "Long-Life Polysulfide-Polyhalide Batteries with a Mediator-Ion Solid Electrolyte," ACS Applied Energy Materials, 2019, vol. 2, pp. 3445-3451.

Yang, Y. et al., "A Membrane-Free Lithium/Polysulfide Semi-Liquid Battery for Large-Scale Energy Storage," Energy & Environmental Science, 2013, vol. 6, pp. 1552-1558.

Meyerson, M. L. et al., "Recent Developments in Dendrite-Free Lithium-Metal Deposition through Tailoring of Micro- and Nanoscale Artificial Coatings," ACS Nano, 2021, vol. 15, pp. 29-46.

Meyerson, M. L. et al., "The Effect of Local Lithium Surface Chemistry and Topography on Solid Electrolyte Interphase Composition and Dendrite Nucleation," Journal of Materials Chemistry A, 2019, vol. 7, pp. 14882-14894.

Wang, Y. et al., "High-Capacity Lithium Sulfur Battery and Beyond: A Review of Metal Anode Protection Layers and Perspective of Solid-State Electrolytes," Journal of Materials Science, 2018, vol. 54, pp. 3671-3693.

Rodriguez, R. et al., "Separator-Free and Concentrated $LiNO_3$, Electrolyte Cells Enable Uniform Lithium Electrodeposition," Journal of Materials Chemistry A, 2020, vol. 8, pp. 3999-4006.

Wu, F. et al., "Lithium Iodide as a Promising Electrolyte Additive for Lithium-Sulfur Batteries: Mechanisms of Performance Enhancement," Advanced Materials, 2015, vol. 27, pp. 101-108.

Li, J. et al., "The Application of Redox Targeting Principles to the Design of Rechargeable Li-S Flow Batteries," Advanced Energy Materials, 2015, vol. 5, 1501808, 6 pages.

Li, J. et al., "Combined Mediator and Electrochemical Charging and Discharging of Redox Targeting Lithium-Sulfur Flow Batteries," Materials Today Energy, 2017, vol. 5, pp. 15-21.

Zhang. S. et al., "Recent Progress in Polysulfide Redox-Flow Batteries," Batteries & Supercaps, 2019, vol. 2, pp. 627-637.

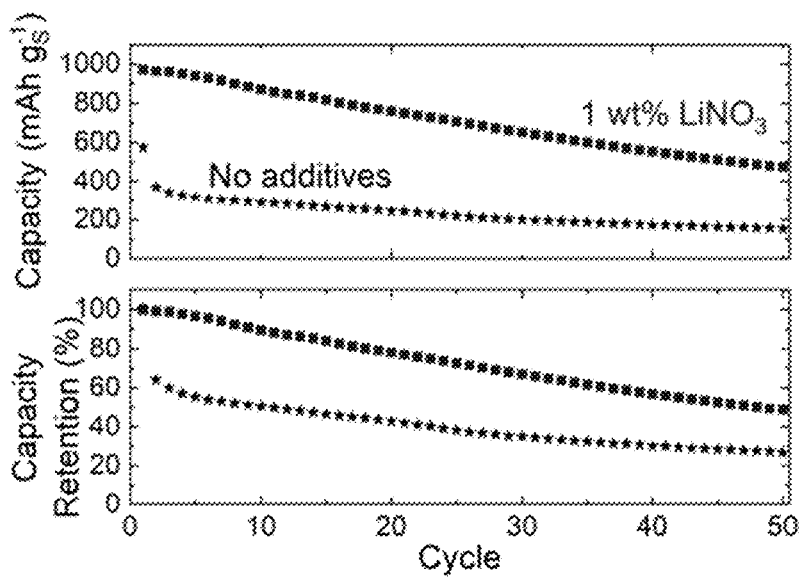
FIG. 5A
FIG. 5B
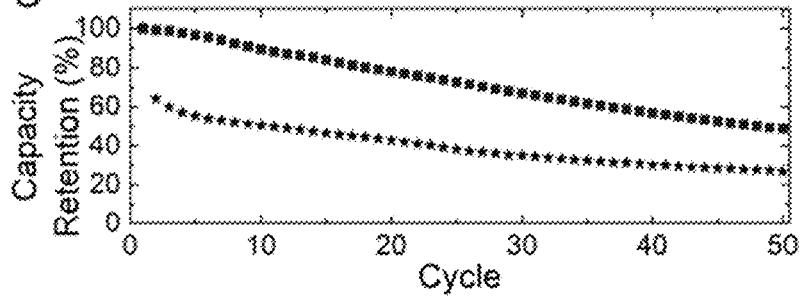
FIG. 5C
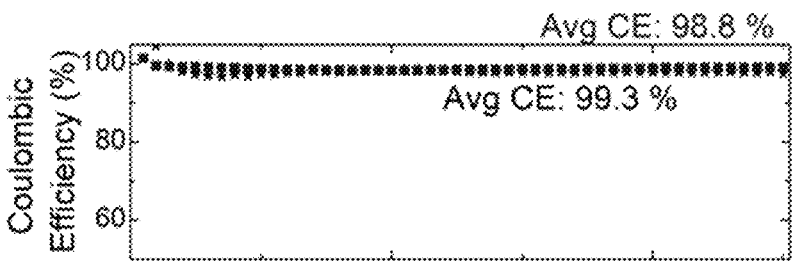
FIG. 5D
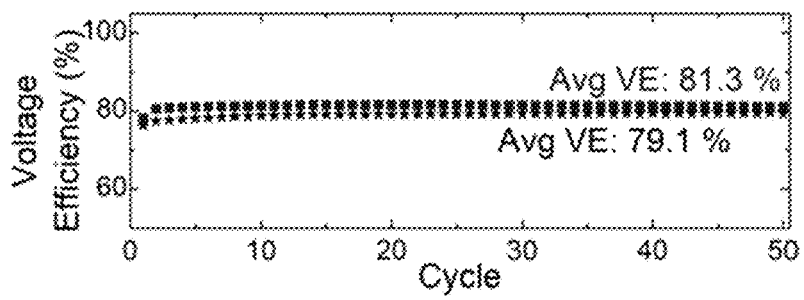
FIG. 5E
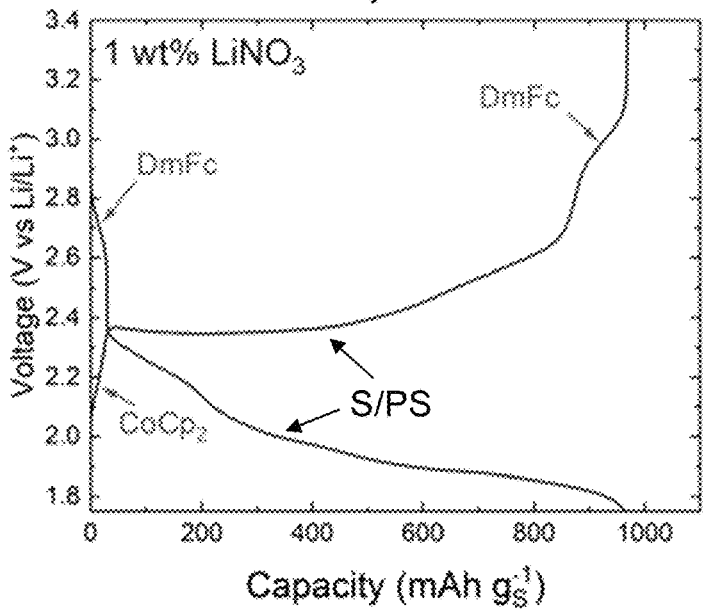

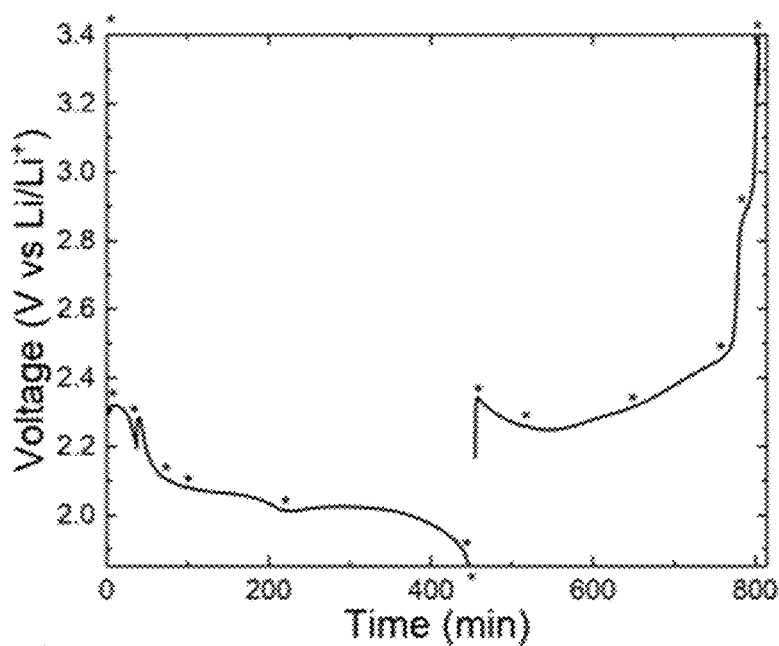
FIG. 6A
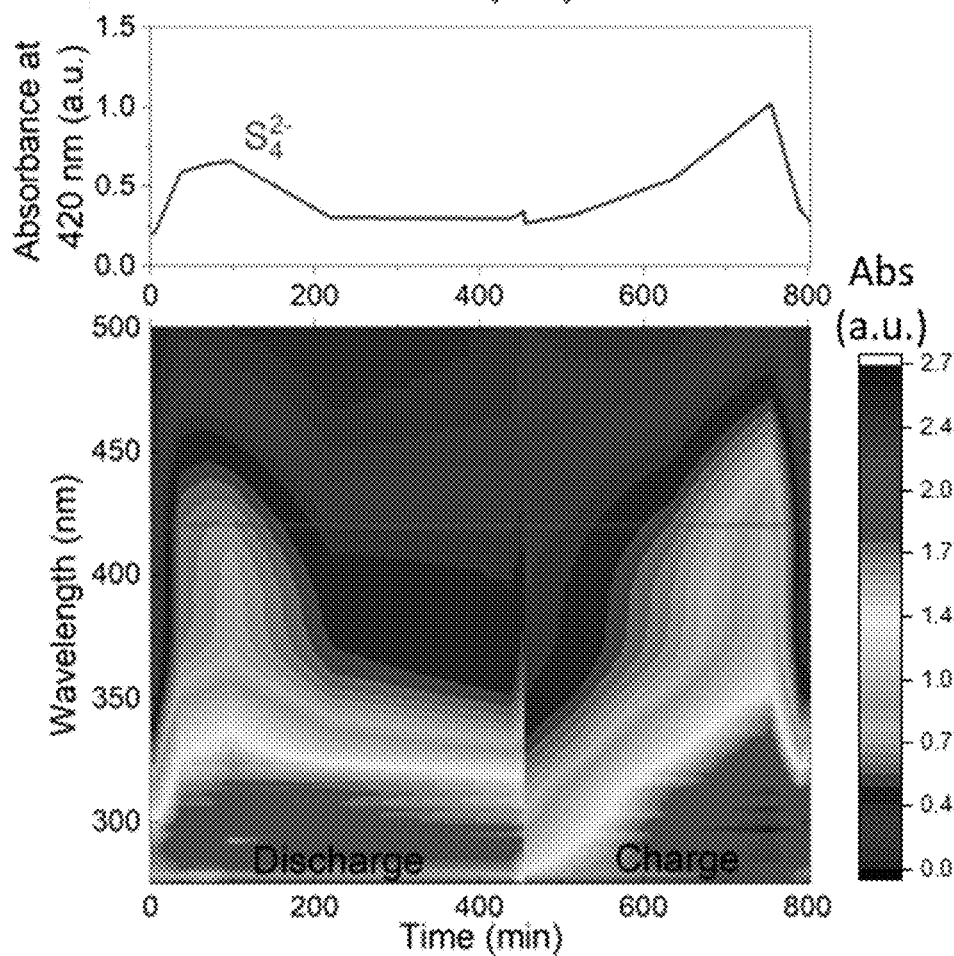
FIG. 6B
FIG. 6C

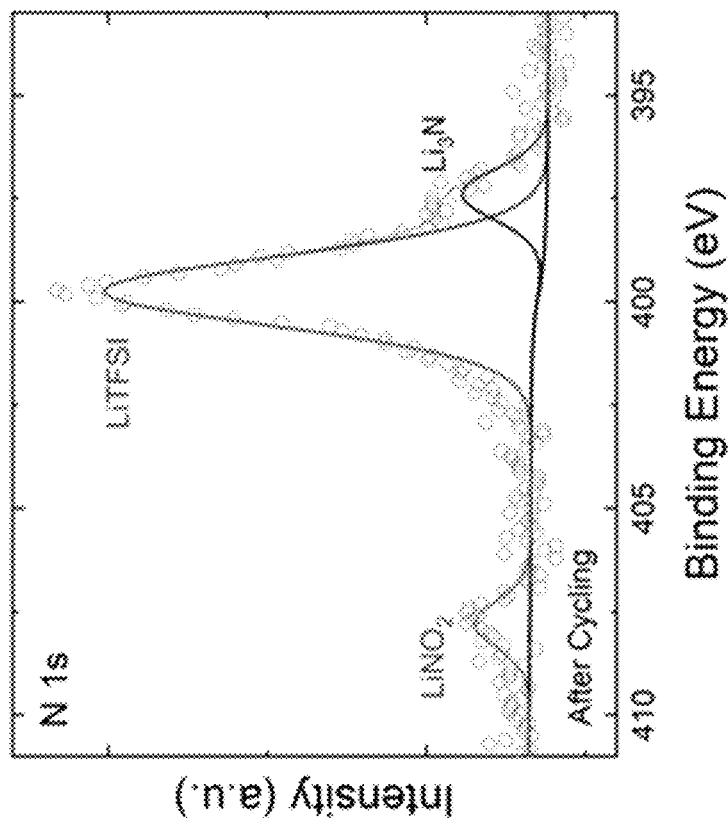
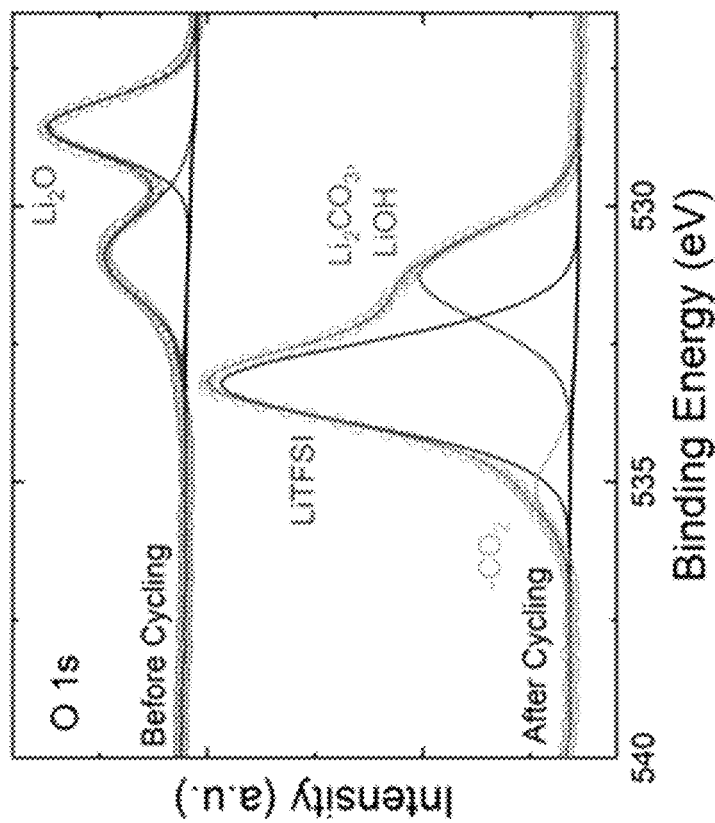
FIG. 7D
FIG. 7C

MEDIATED METAL-SULFUR FLOW BATTERY FOR GRID-SCALE ENERGY STORAGE

CROSS-REFERENCE TO RELATED APPLICATION

This application claims the benefit of U.S. Provisional Application No. 63/224,151, filed Jul. 21, 2021, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to redox flow batteries and, in particular, to a mediated metal-sulfur flow battery for grid-scale energy storage.

BACKGROUND OF THE INVENTION

There is a pressing need for inexpensive, safe, and reliable batteries with a high capacity for grid storage applications. According to Bloomberg, the average cost for Li-ion cells ranged as low as $100-130/kWh in 2021. This can be thought of as a threshold needed for a battery to be economically competitive. The high capacity (1675 mAh $g_s^{-1}$) and low cost (~$0.1 $kg^{-1}$) of sulfur make Li—S batteries ideal for this application as their theoretical energy density is 2600 Wh $kg^{-1}$. See S. S. Zhang, J. Power Sources 231, 153 (2013); M. Rana et al., Energy Storage Mater. 18, 289 (2019); and M. Zhao et al., ACS Cent. Sci. 6(7), 1095 (2020). Expanding Li—S to MWh-GWh grid scale capacities, however, necessitates a change in cell architecture. Li—S battery cathodes are commonly made as films, where S/carbon slurries are cast onto metal foil current collectors. As the areal S loading, and thus theoretical capacity, of a cell is increased beyond 4-5 mg $cm^{-2}$, there are diminishing returns on the energy density of the cell due to the decreased accessibility of the S in the back of the film, although higher S loadings have been demonstrated at lower capacities. See J. Wu et al., Adv. Mater. 33(26), e2101275 (2021); and R. Yu et al., J. Mater. Chem. A 6(48), 24841 (2018). At grid scale, decreasing the non-active materials could significantly reduce costs. Moreover, in film implementations, the anode and cathode are separated by <0.1 mm, preventing effective control of energy release during possible thermal runaway events. See J. Lamb et al., J. Power Sources 283, 517 (2015).

Redox flow batteries (RFBs), on the other hand, offer a safe, easily scalable architecture amenable for grid scale energy storage. See B. R. Chalamala et al., Proc. IEEE 102(6), 976 (2014); and P. Leung et al., RSC Adv. 2(27) 1502183 (2012). Physical separation of anode and cathode limits thermal runaway concerns, while power generation can be scaled independently of the energy storage capacity of the system. Nonaqueous RFBs, in particular, offer the ability to access higher voltages outside the water voltage stability window and are compatible with ultra-high energy density alkali metal anodes. See T. C. Palmer et al., ChemSusChem 14(5), 1214 (2020); and S. Hamelet et al., J. Electrochem. Soc. 159(8), A1360 (2012). Unfortunately, the relatively high cost of nonaqueous solvents, compared to water, necessitates increasingly high concentrations, ideally M, of redox-active species to be cost-competitive. See R. M. Darling et al., Energ. Environ. Sci. 7(11), 3459 (2014). One strategy to increase concentration involves pumping semi-solid slurries of known battery chemistries—LiCoO2, $LiNi_{0.5}Mn_{1.5}O_4$, $Li_4Ti_5O_{12}$, S and electronically conductive carbons—through flow cells, increasing effective concentrations >10 M. See M. Duduta et al., Adv. Energy Mater. 1(4), 511 (2011); and H. Chen and Y.-C. Lu, Adv. Energy Mater. 6(8) 1502183 (2016). While good performance has been seen, removing conductive carbons could decrease pumping costs and self-discharge concerns over long times.

Another strategy to enhance RFB solubility, dubbed "redox-targeting," leverages soluble redox-active molecules (redox mediators, RMs) to oxidize and reduce solid energy storing materials, the mediators being recharged in the RFB's electrochemical cell. See R. Yan and Q. Wang, Adv Mater. 30(47), e1802406 (2018); and T. N. Pham-Truong et al., ChemSusChem 13(9), 2142 (2020). Like the carbon slurry approach, the effective concentration of active materials can easily exceed >10 M, but electronically conductive carbon is not needed. See C. P. Jia et al., Sci. Adv. 1(10), 1500886 (2015); S. Gentil et al., Curr. Opin. Electrochem. 21, 7 (2020); and C. M. Wong and C. S. Sevov, ACS Energy Letters 1271 (2021). Regardless, RFBs still exhibit several limiting factors, with the performance of ion-*exchange membranes being the most widely cited. See L. J. Small et al., J. Electrochem. Soc.* 163(1), A5106 (2015); L. J. Small et al., J. Electrochem. Soc. 166(12), A2536 (2019); S.-H. Shin et al., RSC Adv. 3, 9095 (2013); and D. I. Kushner et al., Curr. Opin. Electrochem. 21, 132 (2020).

Li—S batteries can benefit from RMs as well. $Li_2S$ is electronically insulating, has a high charge transfer resistance, and is insoluble, so the redox mediation of $Li_2S$ oxidation has been demonstrated to enhance the active material utilization in static Li—S cells. See S. Meini et al., J. Phys. Chem. Lett. 5(5), 915 (2014). Additionally, the intermediate polysulfides (PSs) that form during charge and discharge of Li—S batteries have been used as mediators for $LiTi_2PO_4$ in a flow cell. See J. Yu et al., ACS Energy Lett. 3(10), 2314 (2018). In fact, PSs have been demonstrated as high-performing, low cost redox-active species for flow batteries. See Z. Li et al., Joule 1(2), 306 (2017). Many of these studies use solid-state separators to prevent crossover, while also limiting the voltage range to keep the S mainly in the soluble PS phase, which limits the capacity of the battery. See E. C. Self et al., J. Electrochem. Soc. 168(8) 080540 (2021); M. M. Gross and A. Manthiram, ACS Appl. Mater. Interfaces 10(13), 10612 (2018); and M. M. Gross and A. Manthiram, ACS Appl. Energy Mater. 2(5), 3445 (2019). Others have successfully used multiple polychalcogenides to extend the capacity of the S, but still use a solid-state separator. See Y. Zhou et al., ACS Energy Lett. 5(6), 1732 (2020). Elimination of the solid-state separator or ion-selective polymeric membrane would decrease cost and decrease complexity, as fewer, potentially unstable, interfaces are present in addition to increasing the ionic conductivity, enabling faster cycling. See T. Brahmbhatt et al., Front. Energy Res. 8, 570754 (2020); Judez et al., J. Electrochem. Soc. 165(1), A6008 (2017); and K. Fu et al., Sci. Adv. 3, e1601659 (2017).

Pure Li metal anodes have been used in flow battery systems, though not to the same extent as PS. See S. Hamelet et al., J. Electrochem. Soc. 159(8), A1360 (2012). Instead, many reports that employ Li-anodes use static cells, as is common in this research area. See L. Cosimbescu et al., Sci. Rep. 5, 14117 (2015). Yang et al. demonstrated that intentionally limited use of PS capacity is possible with a Li anode, LiNO$_3$ additives, and no ion-selective membrane in coin cells. See Y. Yang et al., *Energ. Environ. Sci.* 6(5) 1552 (2013).

Using lessons learned from the Li-metal anode community, a membrane-less Li-metal RFB might be obtained, implementing a stable solid electrolyte interphase (SEI) coating and minimizing dendritic growth. See Y. Yang et al., *Energ. Environ. Sci.* 6(5) 1552 (2013); M. L. Meyerson et al., *ACS Nano* 15(1), 29 (2020); M. L. Meyerson et al., *J. Mater. Chem. A* 7(24), 14882 (2019); and Y. Wang et al., *J. Mater. Sci.* 54(5), 3671 (2018). The addition of LiNO$_3$ to the electrolyte has been shown to both improve the Li deposition and mitigate PS shuttling. See Y. Yang et al., *Energ. Environ. Sci.* 6(5) 1552 (2013); and R. Rodriguez et al., *J. Mater. Chem. A* 8(7), 3999 (2020). Pre-soaking the Li in LiI has also been shown to enable the formation of a stable SEI. See F. Wu et al., *Adv. Mater.* 27(1), 101 (2015).

Combining ideas from the Li-metal anode and RFB communities, Lee's group has used engineered sulfur/polymer composites and a complex hybrid graphite/Li-metal anode to demonstrate the viability of a redox-mediated Li—S battery to access <50% the capacity of available S. See J. Li et al., *Adv. Energy Mater.* 5(24), 1501808 (2015); and J. Li et al., *Mater. Today Energy* 5, 15 (2017). However, it is not clear what the predominant failure mechanism is, nor how the chosen mediator will always enable complete reduction of S into Li$_2$S.

SUMMARY OF THE INVENTION

The present invention is directed to a mediated metal-sulfur flow battery, comprising a catholyte reservoir for storing an energy storage material comprising sulfur; an electrochemical cell comprising a metal anode, and a cathode compartment comprising a cathode electrode and a catholyte comprising a first redox mediator and a second redox mediator in a solvent; and a pump or gravity means for flowing the catholyte through the catholyte reservoir and the electrochemical cell, such that the redox mediators can undergo redox reactions with the energy storage material in the catholyte reservoir and the cathode electrode in the cathode compartment. The flow battery preferably comprises lithium-sulfur battery. The metal anode can be housed in an electrochemical cell typical of a redox flow battery, while the solid sulfur can be contained in a separate storage tank or catholyte reservoir. An electrolyte containing relatively low concentrations of redox mediators is flowed through the catholyte reservoir and into the electrochemical cell.

This architecture provides a battery format that is readily scalable to grid-scale levels at low cost, while maintaining battery safety by physically separating the anode and cathode. In particular, the marriage of a redox-targeting scheme to an engineered Li solid electrolyte interphase (SEI) enables a scalable, high efficiency, membrane-less Li—S redox flow battery. As examples, electrochemically facile decamethyl ferrocene and cobaltocene can be used as redox mediators to kick-start the initial reduction of solid S into soluble polysulfides on the cathode side and final reduction of polysulfides into solid Li$_2$S, precluding the need for conductive carbons. On the anode side, a LiI and LiNO$_3$ pretreatment and additive strategy encourages a stable SEI and lessens capacity fade, avoiding the need for ion-selective separators. Complementary materials characterization confirmed the uniform distribution of LiI in the SEI, while SEM confirmed the presence of lower surface area globular Li deposition and UV-Vis spectroscopy confirmed evolution of the polysulfide species. Equivalent areal loadings of up to 50 mg cm$^{-2}$ (84 mAh cm$^{-2}$) were demonstrated, with high capacity and voltage efficiency (VE) at 1-2 mgs cm$^{-2}$ (973 mAh g$_s^{-1}$ and 81.3% VE in static cells and 1142 mAh g$_s^{-1}$ and 86.9% VE in flow cells). These results enable a hybrid redox flow battery architecture, obviating the need for ion-selective membranes or flowing carbon additives, thereby offering a pathway for inexpensive, scalable, safe, MWh scale Li—S energy storage.

BRIEF DESCRIPTION OF THE DRAWINGS

The detailed description will refer to the following drawings, wherein like elements are referred to by like numbers.

FIGS. 5A and 5B are graphs of capacity and capacity retention for a small-scale Li—S cell with 1 wt. % LiNO$_3$ and 0.99 mgs cm$^{-2}$ equivalent loading cycled at 0.5 mA cm$^{-2}$ taken from the second cycle. FIG. 5C is a graph of coulombic efficiency. FIG. 5D is a graph of voltage efficiency. FIG. 5E is a graph of charge-discharge profiles. Cells with additives were presoaked in 20 mM LiI overnight and then had 1 wt. % LiNO$_3$ added to the electrolyte for cycling.

FIG. 6A is a graph of voltage profiles from discharge and charge corresponding to the UV-vis spectra in FIG. 6C, where stars indicate an aliquot was removed. FIG. 6B is a graph showing the change in absorbance at 420 nm corresponding to S$_4^{2-}$ concentration. FIG. 6C is a contour plot of combined UV-vis spectra taken throughout charge and discharge.

FIGS. 7A-7F show X-ray photoelectron spectra (XPS) of Li surface after soaking in 20 mM LiI in 1:1 DOL:DME and after 50 cycles in 1 M LiTFSI with 1 wt. % LiNO$_3$ in DOL:DME at 0.5 mA cm$^{-2}$ for the S 2p region (FIG. 7A), Li 1s region (FIG. 7B), O 1s region (FIG. 7C), N 1s region (FIG. 7D), I 3d region (FIG. 7E), and C 1s region (FIG. 7F).

DETAILED DESCRIPTION OF THE INVENTION

The present invention is directed to a mediated metal-sulfur flow battery for grid scale energy storage applications.

Figure 1:
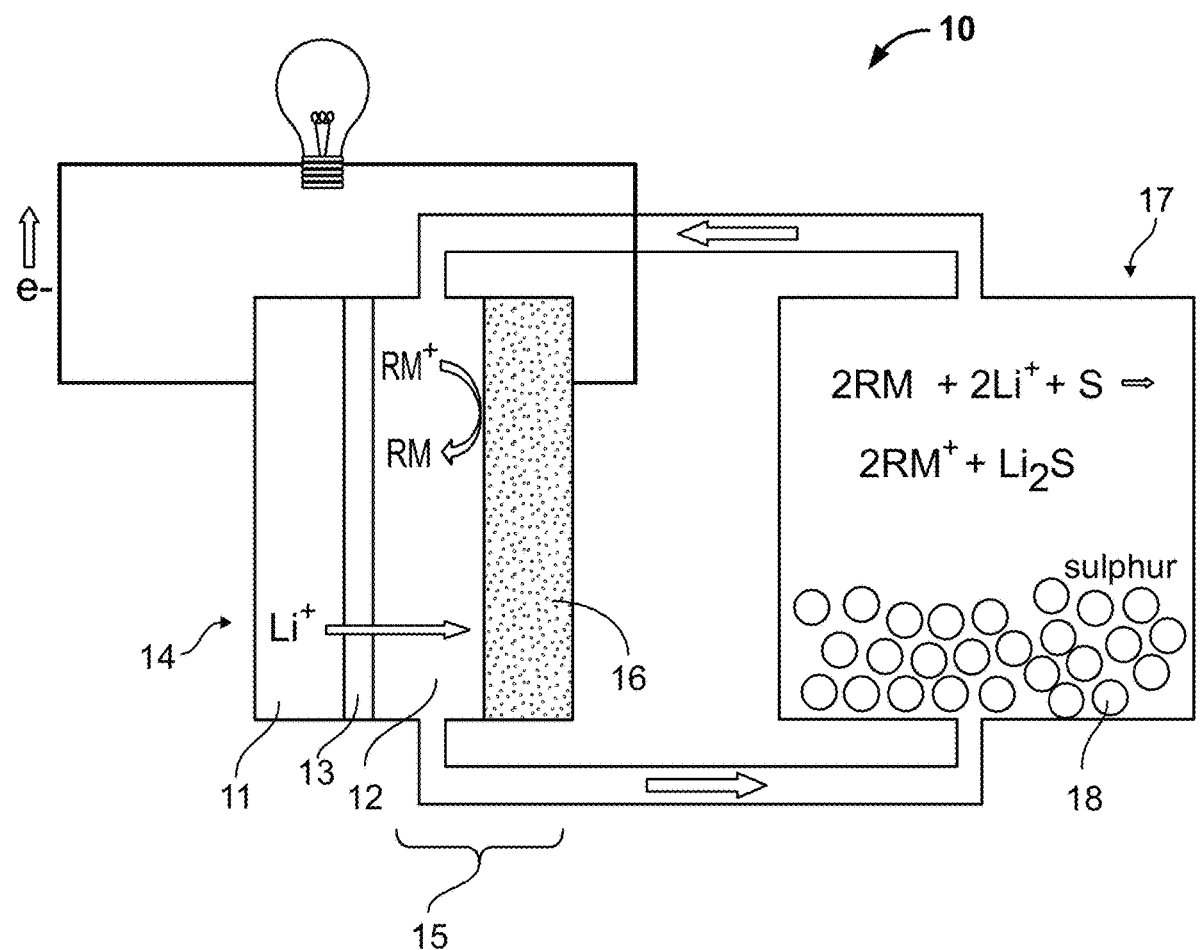
FIG. 1 is a schematic illustration of a mediated metal-sulfur flow battery.

An exemplary battery configuration is depicted in FIG. 1. In this battery 10, a solid metal anode 11 (e.g., lithium) can be separated from a flowing catholyte 12 by a solid-electrolyte interface (SEI) 13. A solid-state ion conductor or ion-selective membrane is not necessary for operation, as will be described below. In addition to the anode 11, an electrochemical cell 14 comprises a cathode compartment 15 containing a cathode electrode 16 and the catholyte 12. Like a redox flow battery, the catholyte 12 flows from the cathode compartment 15 to a storage tank or catholyte reservoir 17. The circulation of the catholyte 12 can be aided by means of a pump (not shown) and/or by gravity. The energy storing material 18 (e.g., S) is housed in the catholyte reservoir 17. The catholyte comprises redox mediators (RMs) and a salt of the anode metal ion dissolved in a solvent. A RM is a compound that can be reversibly oxidized and reduced upon electrochemical cycling. The RMs flow through the reservoir and mediate electron transfer from the electrochemical cell to the energy storage material. Specifically, a first RM is used to reduce the elemental S (e.g., S to $Li_2S$), while a second RM is used to oxidize the reduced S back to elemental S. For example, for a Li-S battery, the first RM can comprise cobaltocene ($CoCp_2$) and the second RM can comprise decamethylferrocene (DmFc), although other redox-active molecules can also be used. For example, the solvent for these RMs can comprise a mixture of 1,3-dioxolane (DOL) and 1,2-dimethoxylane (DME). Other solvents can also be used, including glymes such as tetraethylene glycol dimethyl ether, ionic liquids such as quaternary ammoniums, or carbonate-based electrolytes such as ethylene carbonate, or fluorinated ethylene carbonate. The concentration of RMs can be relatively low (e.g. 100 mM or less) and is not necessarily required to be highly concentration (e.g. >1 M), so that most of the battery capacity comes from sulfur, not the RMs. The catholyte also contains a salt of the anode metal ion (e.g., LiTFSI). The energy storage material 18 can preferably be a packed bed of solid particulate or bead material having a large surface area providing good access to reactive surfaces of the solid for redox reactions with the mediators. In particular, sulfur needs to be in a form that can be reduced from $S°$ to $S^{2-}$ and react with the oxidized metal. The anode 11 can comprise any metal with a relatively low redox potential that can be cleanly oxidized into solution and reduced back to a metal. For a Li-S battery, for example, the anode 11 can comprise solid Li metal. In general, for a metal-sulfur battery the anode 11 can comprise a group 1 or 2 metal, such as Li, Na, K, Mg, or Ca. While a solid foil anode is depicted in FIG. 1, higher surface area architectures such as foams or porous host materials can be used to enhance the battery's rate performance. The SEI 13 is a selective barrier that allows passage of metal ions to and from the metal anode to balance charge and complete the electrical circuit while being stable to the catholyte and RMs. The cathode electrode 16 is preferably a high surface area, charge conducting material that facilitates oxidation and reduction of the RMs but is otherwise inert to the catholyte. For example, the cathode electrode 16 can be porous carbon, carbon felt, or carbon paper. An electrical circuit is completed through the cathode electrode, cathode cell compartment, SEI, anode, and an electrical element. The flow battery can be charged with an electrical power source, or discharged through an electrical load (as shown).

In a standard Li—S battery Li and S are converted through a series of PSs to $Li_2S$ during discharge and then back to Li and S during charge. While the intermediate PSs are soluble in many organic solvents including DOL/DME, the beginning and end species, S and $Li_2S$, are not. This problem has been addressed in flow cells by adding conductive carbon to the catholyte to form a S/C slurry that can be flowed through the cell. See S. Zhang et al., *Batter. Supercaps* 2(7), 627 (2019); and S. Xu et al., *J. Mater. Chem. A* 5(25), 12904 (2017). Other studies have limited the voltage of the cell to keep the S in soluble form, cycling only between $Li_2S_8$ and $Li_2S_4$. See Y. Yang et al., *Energ. Environ. Sci.* 6(5) 1552 (2013). Both approaches limit the theoretical energy density of the battery. Therefore, the present invention uses RMs to oxidize and reduce the S/$Li_2S$ in solution. See S. Meini et al., *J. Phys. Chem. Lett.* 5(5), 915 (2014). This removes the need for carbon additives and allows full cycling of these insoluble species rather than limiting cycling to the soluble regime, which greatly increases the theoretical energy density of the battery from 170 Wh $kg^{-1}$ for a cell limited to $Li_2S_4$ to 2500 Wh $kg^{-1}$ for the full reaction to $Li_2S$. See Y. Yang et al., *Energ. Environ. Sci.* 6(5) 1552 (2013). However, unlike completely insoluble cathodes, such as $LiFePO_4$, the intermediate PSs are soluble and can act as additional RMs, which improves the voltage efficiency. See S. Zhang et al., *Batter. Supercaps* 2(7), 627 (2019). The addition of a RM enables the reduction and oxidation of S to occur in solution while the RM is oxidized or reduced at the counter electrode.

Two different RMs are needed, one to reduce the S during discharge and the other the oxidize the $S^{2-}$ during charge. Preferably, a RM has three specific characteristics: (1) Since the cell potential is dependent on the electrochemical reactions occurring at the electrodes, the redox potential of the RMs should be close to that of the Li—S reaction to reduce the voltage hysteresis and improve the voltage efficiency of the cell. For a voltage efficiency of at least 70% the redox potentials of the RMs must be within 420 mV of the Li—S reaction. (2) The RMs should also have sufficiently fast kinetics. (3) The RMs should have high diffusivity to enable fast charge and discharge. Ferrocene, commonly used for redox targeting, has a diffusion coefficient on the order of $10^{-6}$ $cm^2$ $s^{-1}$ and the metallocenes commonly used in conventional redox flow batteries have reaction kinetics on the order of $10^{-3}$ to $10^{-4}$ cm $s^{-1}$. See J. Li et al., *Adv. Energy Mater.* 5(24), 1501808 (2015); and Y. Ding et al., Energ. Environ. Sci. 10(2), 491 (2017). A number of compounds fit the above criteria, including metallocenes and anthraquinone derivatives, which have both been explored as RMs for Li—S reactions. See S. Meini et al., *J. Phys. Chem. Lett.* 5(5), 915 (2014); and Y. Tsao et al., *Joule* 3(3), 872 (2019).

Figure 2:
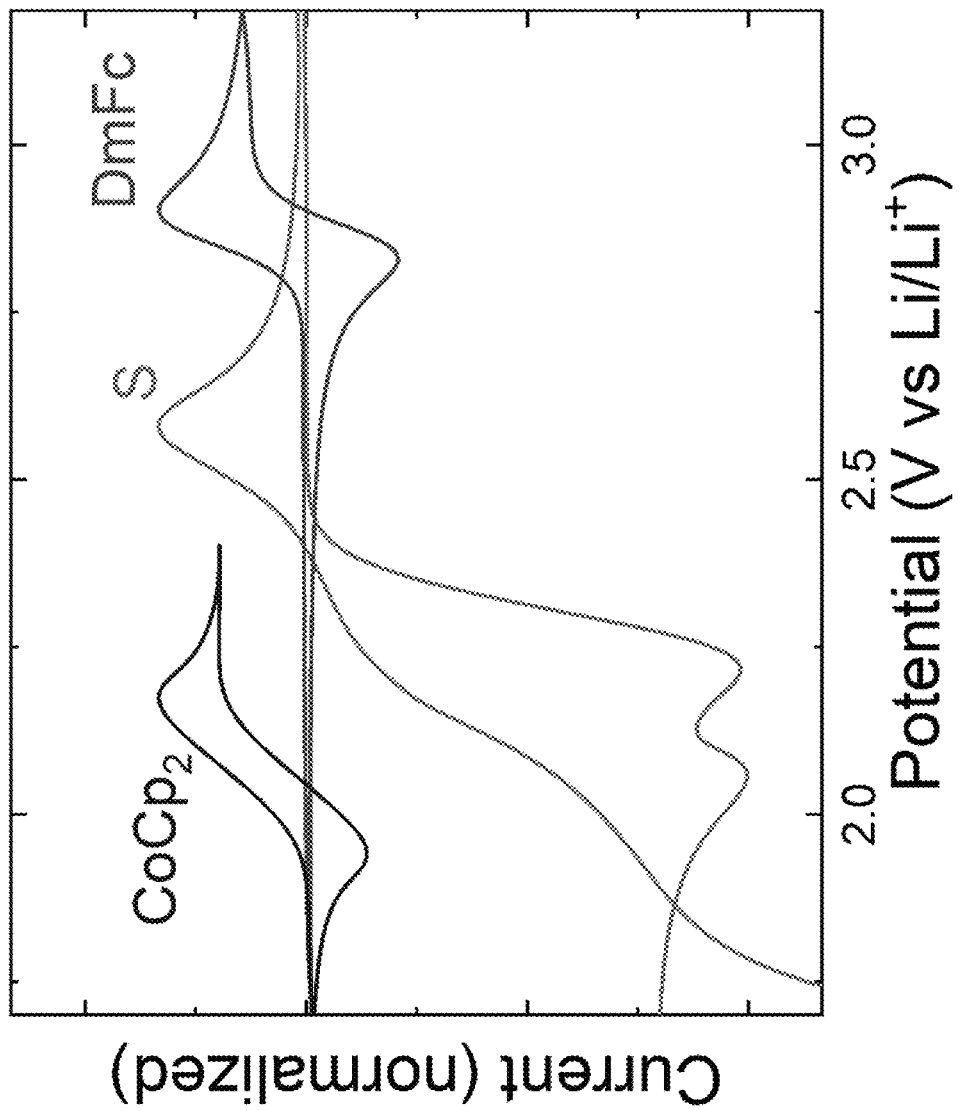
FIG. 2 is a graph of cyclic voltammograms (CVs) at a glassy carbon electrode of redox mediators (RMs) decamethyl ferrocene (DmFc), and cobaltocene (CoCp$_2$), in addition to S, the main energy storing material. Scans were run at 10 mV/s with 8.3 mM DmFc, 20 mM CoCp$_2$, and S at the limit of solubility with 1 M LiTFSI in 1:1 DOL:DME as supporting electrolyte and Pt counter and Li reference electrodes.

Commercially available RMs, cobaltocene ($CoCp_2$) and decamethylferrocene (DmFc), were chosen examples due to their proximity to Li—S reaction, reversibility, and stability in the system. These exemplary RMs and other metallocenes have been studied in other systems and their redox potentials have been found to be highly solvent dependent. For example, $CoCp_2$ has a higher redox potential in dimethylacetamide (DMA) and dimethylformamide (DMF) than it does in DOL. See Y. Ding et al., Energ. Environ. Sci. 10(2), 491 (2017). FIG. 2 depicts the relative redox potentials of sulfur and the two RMs, $CoCp_2$ and DmFc, at a glassy carbon electrode in 1M lithium bis(trifluoromethanesulfonyl)imide (LiTFSI) in 1:1 DME:DOL. Other solvents that are flowable and can dissolve the mediators and in which the mediators are stable can also be used as the catholyte. These mediators have potentials that are slight less than and greater than that of sulfur, enabling mediation of the sulfur oxidation and reduction reactions. The mediator DmFc with a redox potential just above that of the energy storage material (S) is utilized during battery charging, whereas the mediator CoCp$_2$ with a redox potential just below that of S is utilized during discharge. The difference in the redox potentials of a mediator and the energy storage material provides the driving force for electron transfer in the charge and discharge cycles. However, the extra voltage required by mediation during charge or discharge is preferably minimized so that the power efficiency of the system in maximized. For example, the redox potentials of the mediators can preferably be within about 500 mV of the redox potential of sulfur. The cyclic voltammograms (CVs) in FIG. 2 show that the redox potentials of both RMs are within 500 mV of the Li—S reaction (~2.4 V vs Li/Li+) with $E_{DmFc}$=2.86 V and $E_{CoCp2}$=2.06 V. Other compounds with similar redox potentials can be used as mediators.

Figures 3A, 3B:
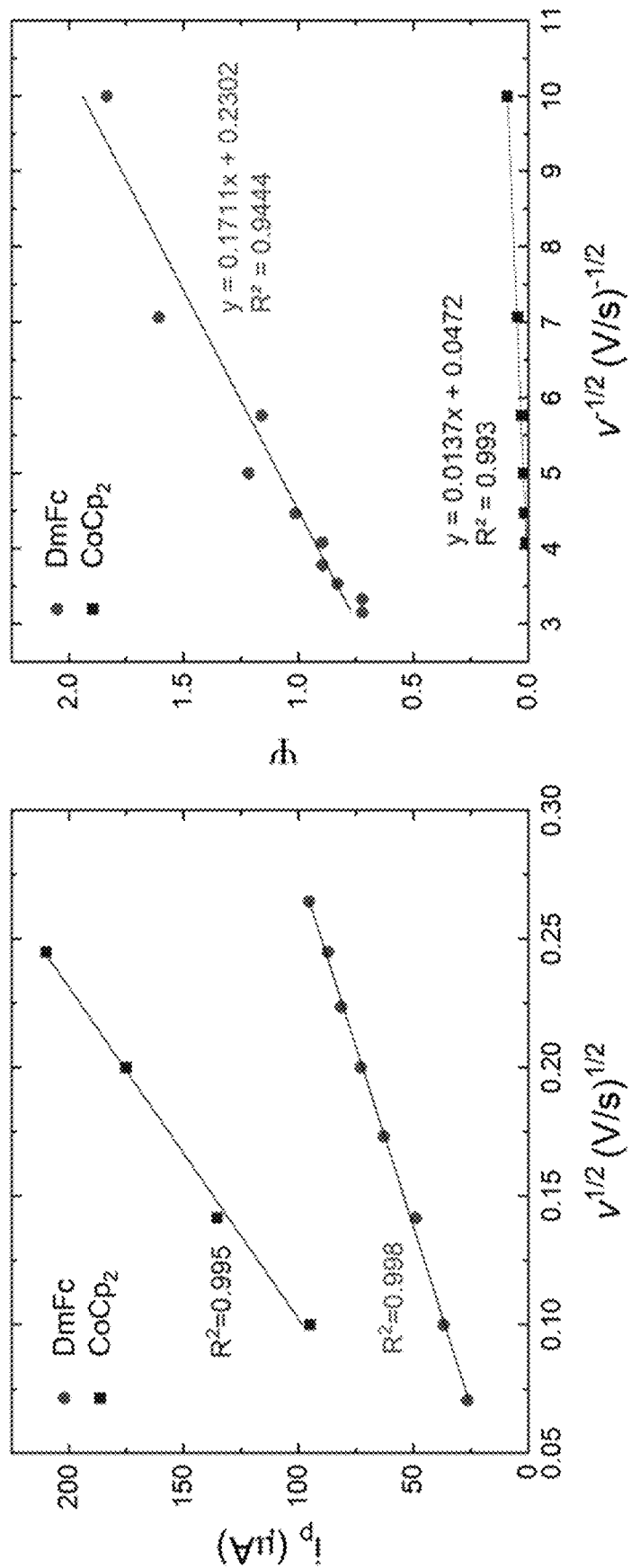
FIG. 3A is a graph of peak current vs square root of the scan rate for the CVs.
FIG. 3B is a graph of iv vs square root of the scan rate for the CVs.

The Randles-Sevcik Eq. (1) was used to determine the diffusion coefficients of the redox mediators.

$$i_p = 2.69 \times 10^5 n^{3/2} A D^{1/2} C v^{1/2} \quad (1)$$

where $i_p$ is the peak current, v is the scan rate, n is the number of electrons transferred, A is the electrode area, D is the diffusion coefficient, and C is the RM concentration. Both RMs show quasi-reversibility as indicated by the symmetric CV peaks and linear relationship between the peak current, $i_p$, and the square root of the scan rate, $v^{1/2}$, shown in FIG. 3A. The slope was used to determine D. By changing the sweep rate and using the Randles-Sevcik equation, the diffusion coefficients of the RMs were determined to be $D_{DmFc}$=5.23×10$^{-6}$ cm$^2$ s$^{-1}$ and $D_{CoCp2}$=3.70× 10$^{-6}$ cm$^2$s$^{-1}$. The diffusion coefficients were then used with the Nicholson method (Eq. 2) to determine the standard heterogeneous electron transfer rate constant of each mediator $$\psi = k^0 [\pi D n v F / (RT)]^{-1/2} \quad (2)$$

where F is the faraday constant, R is the ideal gas constant, T is the temperature, and iv is the kinetic parameter and is related to the peak separation, $\Delta E_p$, by Eq. (3) for $\Delta E_p$<200 mV and Eq. (4) for $\Delta E_p$>200 mV.

$$\psi = \frac{(-0.6288 + 0.0021 \Delta E_p)}{(1 - 0.017 \Delta E_p)} \quad (3)$$

$$\psi = 2.18 \left(\frac{\alpha}{\pi}\right)^{1/2} e^{-(\alpha^2 F/RT) n \Delta E_p} \quad (4)$$

where α is the transfer coefficient. See T. C. Palmer et al., *ChemSusChem* 14(5), 1214 (2020). ψ vs. ½ (Eq. 2) was plotted, using the corresponding $\Delta E_p$ values from Eq. 3 to determine ψ. From the slope of a linear fit to ψ vs. $v^{-1/2}$, the standard heterogeneous electron transfer rate constant of each mediator at a glassy carbon electrode was determined; $k^0$=4.33×10$^{-3}$ cm s$^{-1}$ and 3.14×10$^{-4}$ cm s$^{-1}$ for DmFc and CoCp$_2$, respectively. In summary, CoCp$_2$ and DmFc are good RMs for the Li—S battery, displaying ideal redox potentials coupled with good reversibility, diffusion coefficients, and electron transfer rates.

On discharge the following reactions occur:

Anode: Li→Li$^+$+e$^-$

Cathode: Catholyte reservoir: S+2CoCp$_2$+2Li$^+$→ Li$_2$S+2CoCp$_2^+$

Cathode electrode: CoCp$_2^+$+e$^-$→CoCp$_2$

Overall: 2Li+S→Li$_2$S

During discharge, the first RM (CoCp$_2$) is oxidized (losses an electron) through a redox reaction with the energy storage material (S) which is correspondingly reduced (to Li$_2$S). The oxidized first RM (CoCp$_2^+$) is circulated from the external catholyte reservoir into the cathode electrode compartment where it is reduced (gains an electron) at the cathode electrode (e.g. porous carbon cathode). The engineered SEI is a selective barrier that allows passage of lithium ions while preventing the RMs from passing through. Therefore, during battery discharge, while the first RM is being reduced at the cathode electrode, the charge can be balanced by the transport of Li$^+$ through the SEI from the anode to the cathode side to complete the electrical circuit. The second RM (DmFc) circulates with the catholyte but is inactive and does not react during the discharge cycle. This discharge cycle can continue until the energy storage material is fully reduced. Conversely, on charge the following reactions occur:

Anode: Li$^+$+e$^-$→Li

Cathode: Catholyte reservoir: Li$_2$S+2DmFc→2Li$^+$+ S+2DmFc

Cathode electrode: DmFc→DmFc$^+$+e$^-$

Overall: Li$_2$S→2Li+S

During charging, the second RM (DmFc) is oxidized at the cathode electrode surface. The oxidized second RM (DmFc$^+$) is circulated from the cathode electrode compartment into the external catholyte reservoir where it is reduced (to DmFc) through a redox reaction with the reduced energy storage material (Li$_2$S) which is correspondingly oxidized (to S). During battery charge, while the second RM is being oxidized (loses an electron) at the cathode, the charge can be balanced by the transport of Li$^+$ through the SEI from the cathode to the anode side. The first RM (CoCp$_2$) circulates with the catholyte but is inactive and does not react during the charge cycle. This charge cycle can continue until the reduced energy storage material is fully oxidized.

Experimental Electrochemical Cells

Figure 4A:
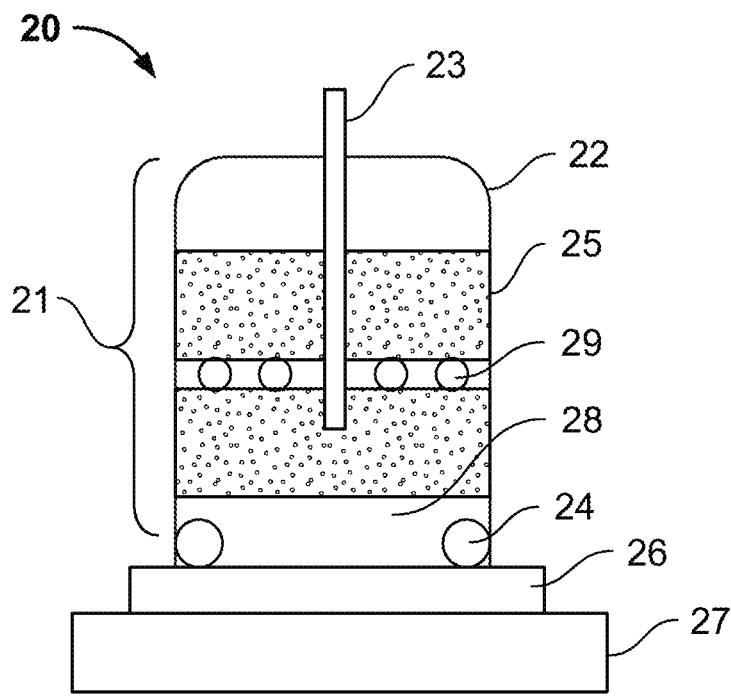
FIG. 4A is a static cell design.

The performance of the mediated Li—S was evaluated in a small static cell 20 for proof of concept, as shown in FIG. 4A. The static cell enabled the impact of the RMs and additives to be evaluated in a simple, more controlled system than the full flow cell 30, shown in FIG. 4B. All electrochemical testing occurred in an argon-filled glovebox with <0.1 ppm H$_2$O and <0.5 ppm 02. Both static and flow cells contained Li metal (0.75 mm thick for static cells and 1.5 mm thick for flow cells) as the anode and carbon felt as the counter electrode. Electrolyte in all cells was 1 M LiTFSI in 1:1 (v/v) DOL:DME. To enhance SEI stability, chemical additives were employed. First, Li foil was soaked in 20 mM LiI in 1:1 (v/v) DOL:DME overnight. The Li foil was removed from solution, rinsed with DME, and dried under vacuum for 10 minutes. Additionally, 1 wt. % LiNO$_3$ was added to 1 M LiTFSI electrolyte during testing. "No additive" cells did not employ LiI or LiNO$_3$.

Initial testing was conducted in small (1.237 cm diameter) or large (1.872 cm diameter) static cells 20 sealed to prevent solvent evaporation. The cathode compartment 21 comprised a glass tube 22 with a Au-plated W rod 23 glass sealed into one end, and an o-ring joint 24 at the other end. Carbon felt 25 surrounded the Au/W rod 23. The Li anode 26 was placed on a Cu plate 27 for support and was sealed to the glass tube 22 with a Kalrez or EPDM o-ring 24. In this design there is a gap of about 1 cm between the C felt 25 and Li anode 26 to contain a stationary electrolyte 28; no separator of any kind was used. The diameter of the o-ring 24 determined the available surface area of the Li: 1.20 cm$^2$ for the small static cell and 2.75 cm$^2$ for the large static cell.

For the small static cell, S and RMs were pre-dissolved in electrolyte to a concentration of 13.6 mM S (0.99 mg cm$^{-2}$) and 1.36 mM for each CoCp$_2$ and DmFc. In this case, the presence of the RMs is important because they reduce the S to allow it to form polysulfides enabling it to fully dissolve in the electrolyte. For the large static cell, a higher S loading (78 mM, 4.4 mg cm$^{-2}$) was added in powder form into a pocket 29 created in the C felt 25, without any binder or additional conductive carbon. The RMs were pre-dissolved at 7.8 mM. As the solubility of S in the electrolyte is on the order of 10 mM, significant amounts of solid S remained undissolved in the large static cell.

Figure 4B:
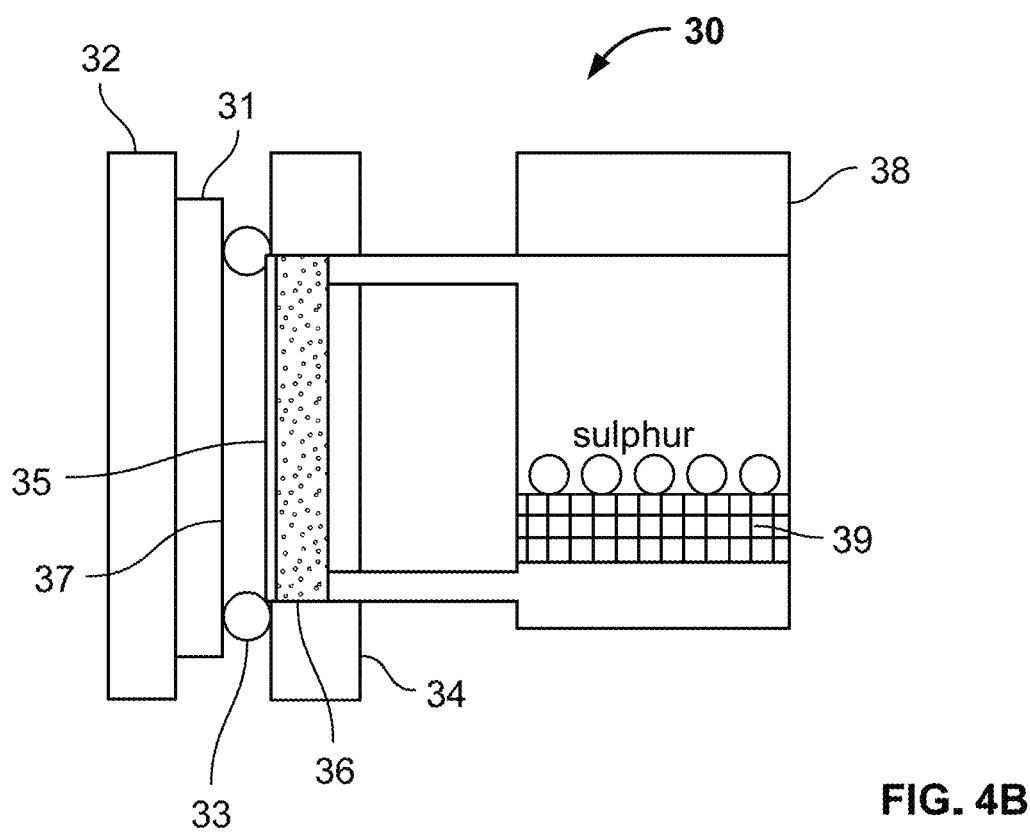
FIG. 4B is a flow cell design.

To minimize the solvent evaporation that may occur in traditional graphite block flow cells, an all-metal flow cell 30 was designed, as shown in FIG. 4B. Here the Li foil 31 was placed on a ¼" thick copper plate 32. An EPDM o-ring 33 was used to seal the Li 31 to a ½" thick 316 stainless steel plate 34 into which a conventional (open) flow field was machined. A Celgard 3501 microporous separator 35 and carbon felt 36 were compressed between the Li 31 and stainless steel 34. The Celgard separator 35 is used only to prevent shorting of the Li anode 31 with the C felt current collector 36. Electrolyte 37 was pumped from a sealed glass reservoir 38 through tubing at 5 mL min$^{-1}$. The geometric areas of Li, C felt, and Celgard exposed to electrolyte were each 4.94 cm$^2$. The RMs were pre-dissolved into the electrolyte at a concentration of 0.625 mM and S was added as a powder on top of a glass fiber filter 39 in the reservoir 38.

Electrochemical Testing

To test the cell performance, both static and flow cells were galvanostatically cycled with at 0.5 mA cm$^{-2}$ between 1.75 V and 3.40 V. Select cells employed a voltage hold where a constant voltage step was added at either 1.75 V for discharge or 3.40 V for charge until the current dropped to less than 50 pA. This technique was suggested by Goulet and Aziz as a way to examine the different mechanisms for capacity fade in redox flow batteries. See M.-A. Goulet and M. J. Aziz, *J. Electrochem. Soc.* 165, A1466 (2018). Coulombic efficiency was calculated from the CVs as CE=Q$_d$/Q$_c$*100% where Q$_d$ is the discharge capacity and Q$_c$ is the charge capacity. Voltage efficiency was calculated as VE=V$_d$/V$_c$*100% where V$_d$ is the average voltage on discharge and V$_c$ is the average voltage on charge.

To improve capacity retention, LiNO$_3$ and LiI additives were used. The addition of LiNO$_3$ has been widely shown to protect the Li surface from PS shuttling and reduce the formation of dendrites, which improves the capacity and capacity retention. See Y. Yang et al., *Energ. Environ. Sci.* 6(5) 1552 (2013); and R. Rodriguez et al., *J. Mater. Chem. A* 8(7), 3999 (2020). This is a necessity if a solid-state separator is not used because otherwise high surface area dendrites will form decreasing cell efficiency and battery life. In addition to adding LiNO$_3$ to the electrolyte, the Li anode was presoaked in a 20 mM solution of LiI to form a LiI-rich SEI, which has been shown to be helpful at blocking PS shuttling. See F. Wu et al., *Adv. Mater.* 27(1), 101 (2015); and X. Xiong et al., *Front. Chem.* 7, 827 (2019). Both of these additives function by promoting the formation of a stable SEI that passivates the Li surface. This passivating SEI both physically blocks PSs from reaching the Li metal and also promotes uniform, low surface area Li deposition. See See F. Wu et al., *Adv. Mater.* 27(1), 101 (2015); and S. S. Zhang and J. A. Read, *J. Power Sources* 200, 77 (2012). XPS and EDS confirmed the presence and uniform distribution of I in the form of LiI in the SEI before cycling. When used without LiNO$_3$, the LiI benefit is limited to the first 10 cycles. XPS results, discussed in detail below, suggest that the decrease in battery performance with LiI as the only additive is due to the degradation of the initial LiI-rich SEI.

Static Cell Cycling

As expected, cycling of the static cell with "no additives" produced inferior results, with poor S utilization and rapid capacity fade, as shown in FIGS. 5A and 5B. The combined use of LiI and LiNO$_3$ improves the mediated Li—S cycling performance, increasing initial capacity from 574 to 973 mAh g$_s^{-1}$, while also increasing capacity retention after 50 cycles from 26.9% to 48.9% in small static cells with 0.99 mgs cm$^{-2}$ loading. As shown in FIGS. 5C and 5D, over 50 cycles the average CE and VE were 98.8% and 81.3% respectively for the LiNO$_3$ cell compared to 99.3% and 79.1% for the "no additives" cell. Note that the VE is higher for both than is theoretically possible by relying on the RM alone (E$_{CoCp2}$=2.06 V, E$_{DmFc}$=2.86 V, theoretical max VE=2.06/2.86=72%) because the soluble PSs also act as mediators. Zhou et al. propose that it is the S$_4^{2-}$ that is responsible for mediation of the discharge reaction and S$_8^{2-}$ is responsible for mediation during charge through the following reactions: (1) S$_8$+2S$_4^{2-}$→2S$_8^{2-}$ or (2) S$_8$+4S$_4^{2-}$→4S$_6^{2-}$ for discharge and (3) 4S$^{2-}$+3S$_8^{2-}$→7S$_4^{2-}$ for charge. However, they observe that the dissolution of S$_8$, which is required to initiate the mediation reaction without an additional RM, is a slow process. See Y. Zhou et al., *ACS Energy Lett.* 5(6), 1732 (2020). Thus, even though the PSs can be directly oxidized or reduced during the majority of cycling, the DmFc and CoCp$_2$ are still necessary at the beginning and end of each cycle where insoluble S or Li$_2$S exists. The additives also provide protection and improve capacity retention when the S loading is increased to 4.4 mgs cm$^{-2}$, although the effect is less pronounced, likely due to the increased amount of Li deposited in each cycle.

Examining the voltage-capacity profile in FIG. 5E, the individual contributions of the RMs and S are observed. On charge, the initial rise from 2.1 to 2.4 V is attributed to CoCp$_2$ oxidation. The subsequent rise in charging voltage from 2.4 to 2.6 V is assigned to S/PS oxidation, while the final plateau near 3 V corresponds to DmFc oxidation. The oxidized DmFc$^-$ then mediates S/PS oxidation. Conversely, on discharge, the initial voltage plateau is attributed to DmFc$^+$ reduction, followed by S/PS reduction, which smears into CoCp$_2^+$ reduction. The reduced CoCp$_2$ then mediates S/PS reduction. As expected, the initial DmFc$^-$ reduction on discharge is nearly the same capacity as CoCp$_2$ oxidation on charge, as both RMs are present at the same concentration. These initial plateaus do not contribute to S mediation and are therefore smaller in capacity than the final RM plateau. The expected capacity from the redox mediators is 0.1 mAh each (each 5% of the theoretical S capacity). The relative size of the different plateaus is controlled by both the RM concentration and S concentration. Beyond 10 mM, elemental S is not soluble, increasing the length of the final RM plateau necessary to access all S capacity. See D. Zheng et al., *J. Electrochem. Soc.* 162(1), A203 (2014).

While the small static cells only accessed 973 mAh g$_s^{-1}$ of S's 1675 mAh gs$^{-1}$ theoretical capacity, the amount of S utilized can be increased to 100% of theoretical capacity by adding a voltage hold to the end of the charge/discharge step (not shown). This capacity enhancement is attributed to the diffusion-limited nature of the catholyte reaction, since the electrolyte is not flowing. Practically, the voltage hold doubles the charge time and increases the rate of capacity fade per cycle. This suggests that the capacity fade is caused mainly by the PS shuttling/reaction as capacity fade is related to time rather than number of cycles, which is supported by chemical characterization data described later.

Verification of Catholyte Chemistry Via UV-Vis

During discharge, elemental S is first converted to higher order PSs, which are then converted to lower order PSs and then to $Li_2S$. The exact mechanism and intermediate species are dependent on multiple factors including the solvent used, however, He et al. propose the following general mechanism: where $5 \leq n \leq 8$ for long chain PSs and $2 \leq m \leq 4$ for short chain PSs:

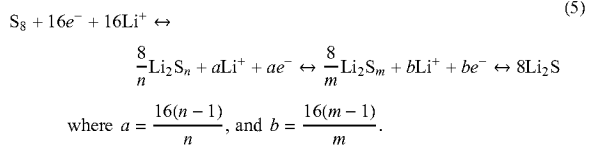

$$S_8 + 16e^- + 16Li^+ \leftrightarrow \frac{8}{n}Li_2S_n + aLi^+ + ae^- \leftrightarrow \frac{8}{m}Li_2S_m + bLi^+ + be^- \leftrightarrow 8Li_2S \quad (5)$$

$$\text{where } a = \frac{16(n-1)}{n}, \text{ and } b = \frac{16(m-1)}{m}.$$

See Q. He et al., *J. Electrochem. Soc.* 167(8) 080508 (2020).

In low dielectric systems, such as DOL:DME, $S_4^{2-}$ is the dominant intermediate during the conversion and its absorbance peak at 420 nm can be used to monitor the reaction progress as the end product, $Li_2S$, is insoluble and not visible in the UV-vis. See Q. He et al., *J. Electrochem. Soc.* 167(8) 080508 (2020); and Q. Zou and Y. C. Lu, *J. Phys. Chem. Lett.* 7(8), 1518 (2016). While DmFc also has an absorption peak at 420 nm, the concentrations used in this system are low enough that it does not interfere with the PS signal there. Therefore, UV-vis spectroscopy was used to verify the chemical changes occurring during discharge and subsequent charge of the small static cell. During testing, aliquots of electrolyte were periodically removed. Therefore, the capacity measured during charge is lower than that of discharge, since a significant amount of active material had been removed by the end of the charge cycle. FIG. 6C shows a contour plot of the UV-vis spectra as a function of charge or discharge, with the profile showing changes in the absorbance at 420 nm. As expected, based on Eq. (5), the PS concentration increases during the beginning of discharge as PSs form then decreases during the end of the discharge step as they convert to $Li_2S$. Although the $Li_2S$ cannot be seen directly with UV-vis, the decrease in all PS species suggests that they must be forming $Li_2S$.

As shown in FIGS. 6A and 6B, the UV-vis shows an increase in the peak at 420 nm as the cell is discharged from 2.4 V to 2.1 V corresponding to the conversion of S to PSs in this voltage range. Note that PSs are present before cycling because the presence of the RM in solution begins the chemical reduction of S before any current is applied. As the PSs convert to shorter chain species between 2.1 and 2.0 V and then to $Li_2S$ throughout the plateau at 2.03 V the peak at 420 nm decreases in intensity. See F. Y. Fan and Y.-M. Chiang, *J. Electrochem. Soc.* 164(4), A917 (2017). The peak at 420 nm never completely disappears even at the voltage cutoff for full discharge, indicating that the conversion of S to $Li_2S$ is incomplete and some of the S remains in the PS form. This, coupled with increased capacity on voltage hold, explains the lower than expected capacity. Complete conversion of S to $Li_2S_4$ should produce a capacity of 419 mAh $g_s^{-1}$, with an additional 1256 mAh $g_s^{-1}$ coming from the conversion of $Li_2S_4$ to $Li_2S$. See C. Barchasz et al., *Anal. Chem.* 84(9), 3973 (2012). The decrease in the absorbance at 420 nm below 2.1 V and the capacity in excess of 419 mAh $g_s^{-1}$ both suggest that there is significant conversion of PSs to $Li_2S$.

During charging this trend is reversed. The absorbance at 420 nm, and thus the PS concentration, increases continuously until the end of the voltage plateau at 2.4 V. Between 2.4 V and the plateau for DmFc oxidation at 2.8 V the 420 nm peak decreases indicating a decrease in the higher order PS concentration as they convert back to S. Similar to discharge, the PS peak never completely disappears, indicating some PSs remain present after charge.

UV-vis also indicates that the concentration of PSs decreases over time. The spectra (not shown) demonstrate a decrease in PS concentration at charge from 0 to 50 to 200 cycles, likely indicating that the loss of capacity is due to the loss of active S in the system. This loss in active S capacity is attributed to reaction with the Li anode, as described below.

Li Anode Surface Characterization

To understand how the chemistry and morphology of the Li anode evolved during cell cycling, the Li anode from the large static cell was examined using XPS and SEM. XPS of the cycled Li anodes also supports the idea that the loss of S is causing capacity fade. In addition to the expected decomposition products from LiTFSI, the XPS spectra, shown in FIGS. 7A-7F, reveal peaks for S, $S^-$, and $S^{2-}$ on the Li anode after charge, indicating that the PSs are shuttling and depositing on the anode. See L. C. Merrill et al., *ACS Appl. Energy Mater.* 4(8), 7589 (2021); and M. I. Nandasiri et al., *Chem. Mater.* 29(11), 4728 (2017). In contrast, the absence of either Co or Fe (not shown) on the Li surface suggests that the RMs are stable and not reacting or being consumed at the Li anode. This is supported by the stable capacity coming from the RMs throughout cycling (not shown).

Scanning electron microscopy (SEM) suggests the beneficial impact of the $LiNO_3$ on the Li morphology. SEM of the treated Li electrode after 50 cycles shows mostly globular rather than filament like deposition, as shown in FIGS. 6A and 6B, which is expected with the $LiNO_3$ added to the electrolyte. See R. Rodriguez et al., *J. Mater. Chem. A* 8(7), 3999 (2020); and B. D. Adams et al., *Nano Energy* 40, 607 (2017). The lower surface area globular deposition morphology decreases the capacity lost to side reactions and reduces the Li available for reaction with PSs.

Figures 7A, 7B:
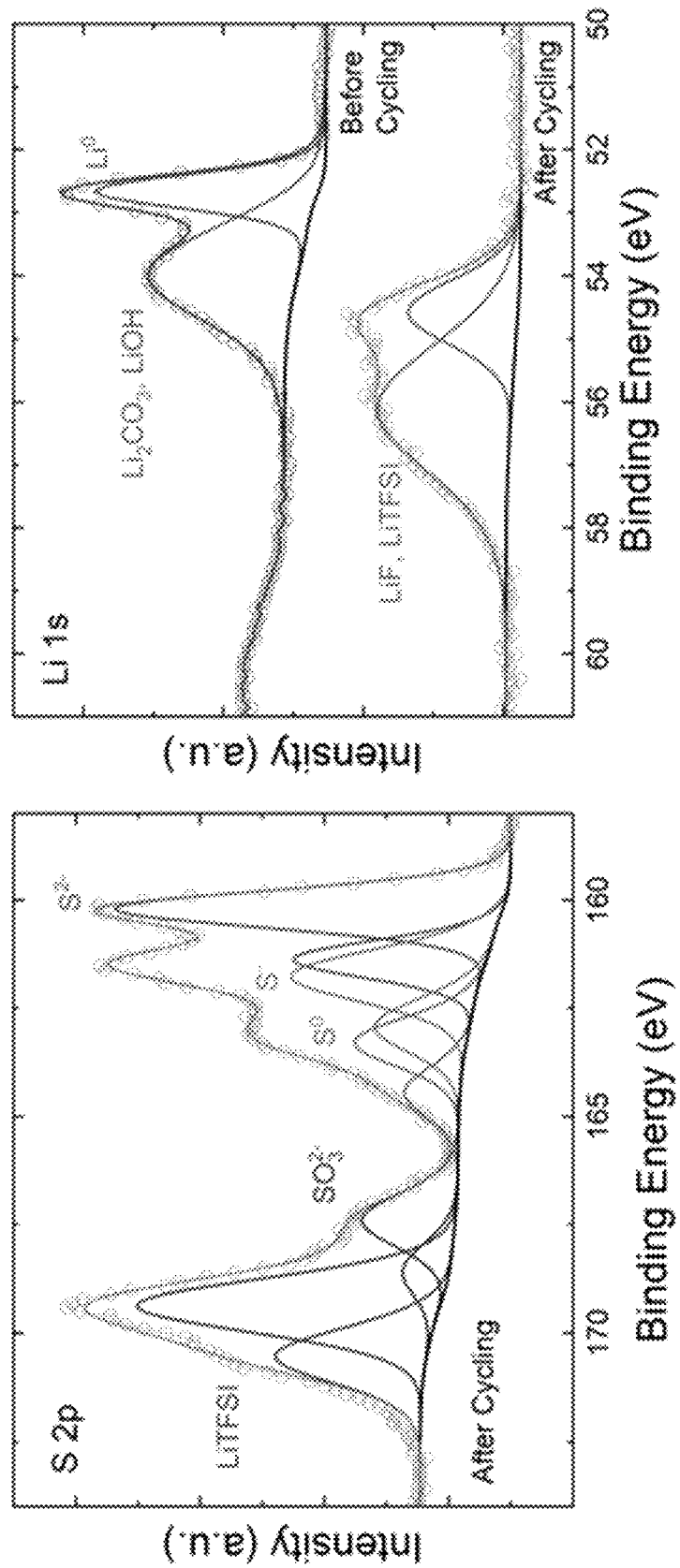
Figures 7E, 7F:
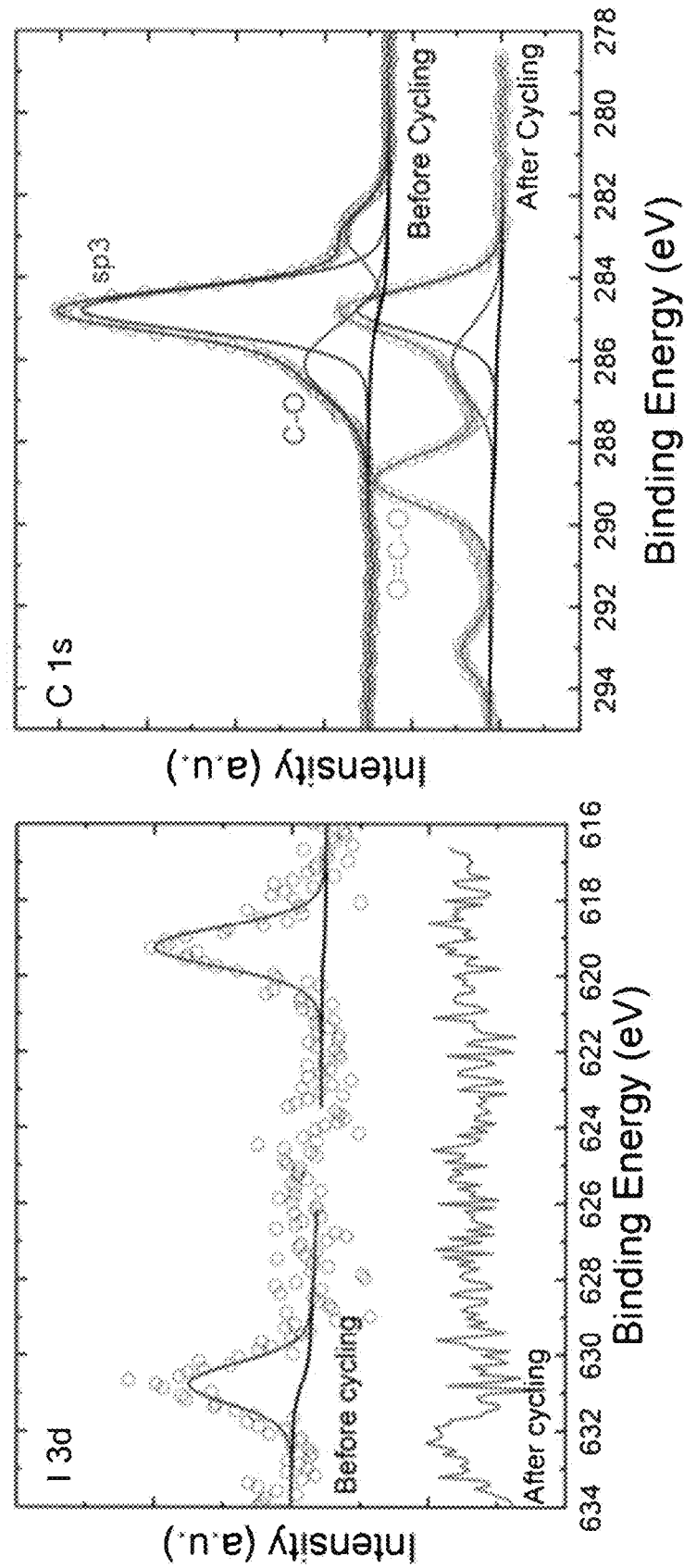
Figure 8B:
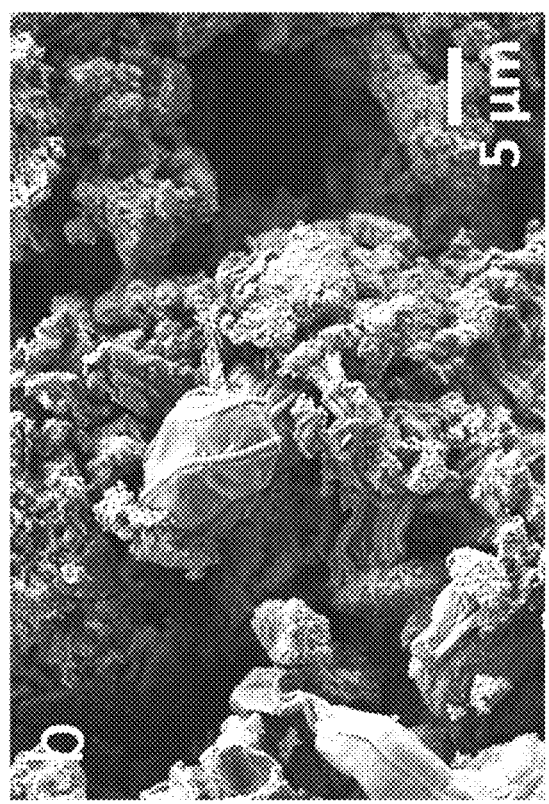
FIG. 8B is a high magnification SEM.
Figure 8A:
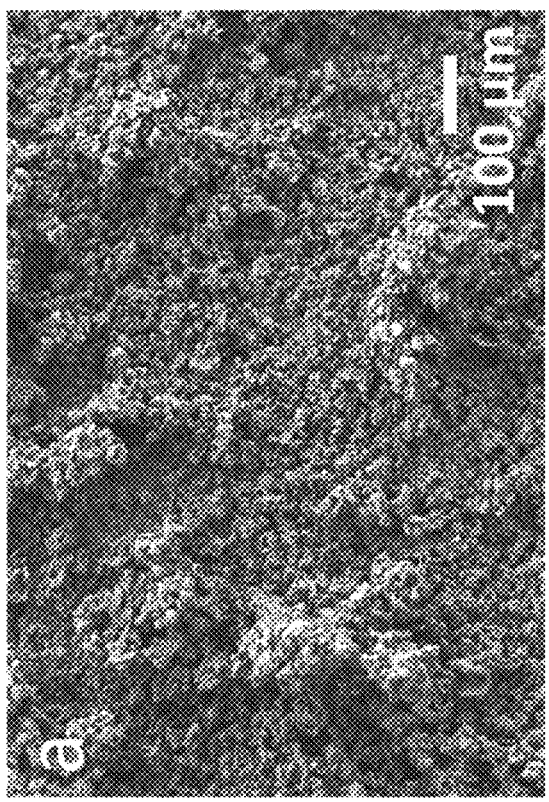
FIG. 8A is a low magnification scanning electron micrograph (SEM) of the LiI-pretreated Li anode after 50 cycles at 0.5 mA cm$^{-2}$ in 1 M LiTFSI with 1 wt. % LiNO$_3$ in 1:1 DOL:DME.

In addition to the expected morphology, $LiNO_2$, and $Li_2SO_3$ are also seen in the SEI after cycling as would be expected from $LiNO_3$, although there is no $Li_2O$ present in FIG. 7B or 7C, indicating the successful incorporation of $LiNO_3$ into the SEI. See B. D. Adams et al., *Nano Energy* 40, 607 (2017); and D. Aurbach et al., *J. Electrochem. Soc.* 156(8) A694 (2009). However, the LiI peak vanishes after 50 cycles, as seen in FIG. 7E, indicating that the original SEI is either covered with new film (a possibility given the disappearance of the metallic Li peak in FIG. 7B) or damaged during the cycling process. The lack of I in the SEI after 50 cycles would suggest that the original protective effects of the LiI are no longer present at long cycling times, explaining the decrease in capacity after 10 cycles when no $LiNO_3$ is present. It is also possible that although $LiNO_3$ is incorporated into the SEI, the LiNO$_3$ in solution has been consumed and is no longer acting as protection for the Li. This is likely given other studies that have shown that LiNO$_3$ is consumed during cycling. See B. D. Adams et al., *Nano Energy* 40, 607 (2017). XPS shows other changes to the SEI composition occur during cycling as well. Specifically, there is a loss of Li$_2$O and increases in Li$_2$CO$_3$, as shown in FIG. 7C. In sum, XPS confirms successful initial incorporation of LiI into the SEI, and reveals thickening of SEI during cycling, with the disappearance of I, and PSs, LiNO$_3$, and LiTFSI incorporated into the SEI after cycling. It also reveals the presence of polysulfides on the anode after cycling, indicating a likely mechanism for the capacity fade observed.

Flow Cell Cycling

A flow battery design offers a safe, easily scalable architecture for grid scale energy storage, enabling the scale-up of the Li—S chemistry to the MWh-GWh grid scale capacity. The electrodes in non-flowing Li batteries have limited possible architectures making it difficult to fully utilize the active material in the cathode at very high mass loadings. See J. Wu et al., *Adv. Mater.* 33(26), e2101275 (2021). In standard LIB cathodes, diffusion of Li ions must occur from the front of the film to the back, however, this is not the case with flow cells. In a flow cell with the active material free in the electrolyte, diffusion of Li$^+$ is not limited to two dimensions. After the success of the proof-of-concept static cell, the system was scaled up into a flow cell, as shown in FIG. 4B. The components were the same as the stationary cell with the addition of a polypropylene Celgard separator between the Li and carbon felt to prevent shorting of carbon fibers on the Li anode, but the Celgard is not ion selective. Three different S loadings were tested in the flow cell to examine how an increase in active material affected the capacity of the cell: low, 2.4 mg cm$^{-2}$, medium, 5 mg cm$^{-2}$, and high S loading, 50 mg cm$^{-2}$. The flow cells show improved voltage efficiency and capacity compared to the static cells, as seen in FIGS. 9A-9D.

Figures 9A, 9B:
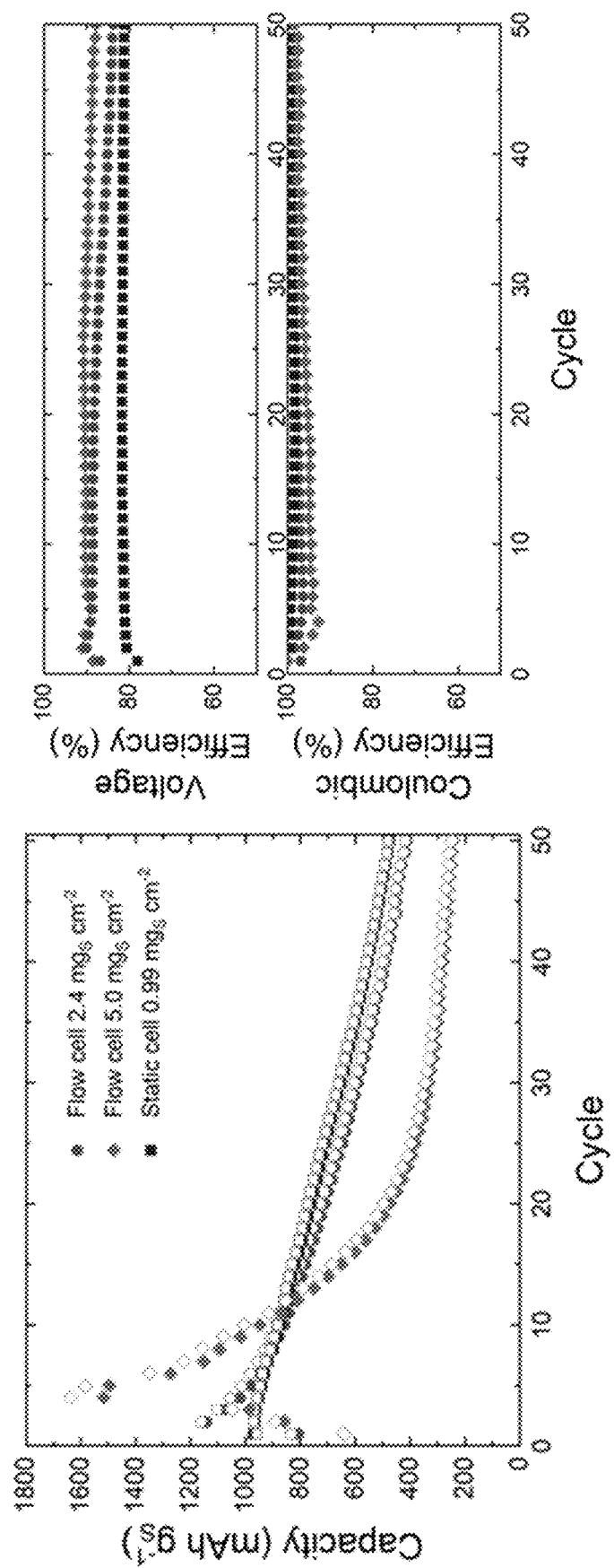
FIG. 9A is a graph of capacity fade for a flow cell.
FIG. 9B is a graph of efficiency.

As shown in FIG. 9A, the lowest S loading had an initial gravimetric capacity of 807 mAh g$_s^{-1}$ increasing to 1142 mAh g$_s^{-1}$ on the second cycle. This is excellent considering the low RM concentration used (0.625 mM) and may even be further improved with higher RM concentration. This is also an improvement over the initial gravimetric capacity of the static cell (965 mAh g$_s^{-1}$, 2$^{nd}$ cycle), indicating better utilization of the S active material in the flow cell than the static cell. Note that the similar 1$^{st}$ and 2$^{nd}$ cycle capacities for the static cell may be due to the fact that the S was pre-dissolved in the electrolyte before cycling began. The S concentration was low enough in the small static cell to fully dissolve with the help of the RM. In contrast, in the flow cells, the solid S was separated from the C electrode completely and relied only on the RM for reduction. In the absence of additional PSs on the first cycle, this may have limited the amount of S that could be reacted with such low RM concentration. Higher PS concentrations on subsequent cycles likely assisted in the more complete reaction of S and thus higher achieved capacities.

Figure 9D:
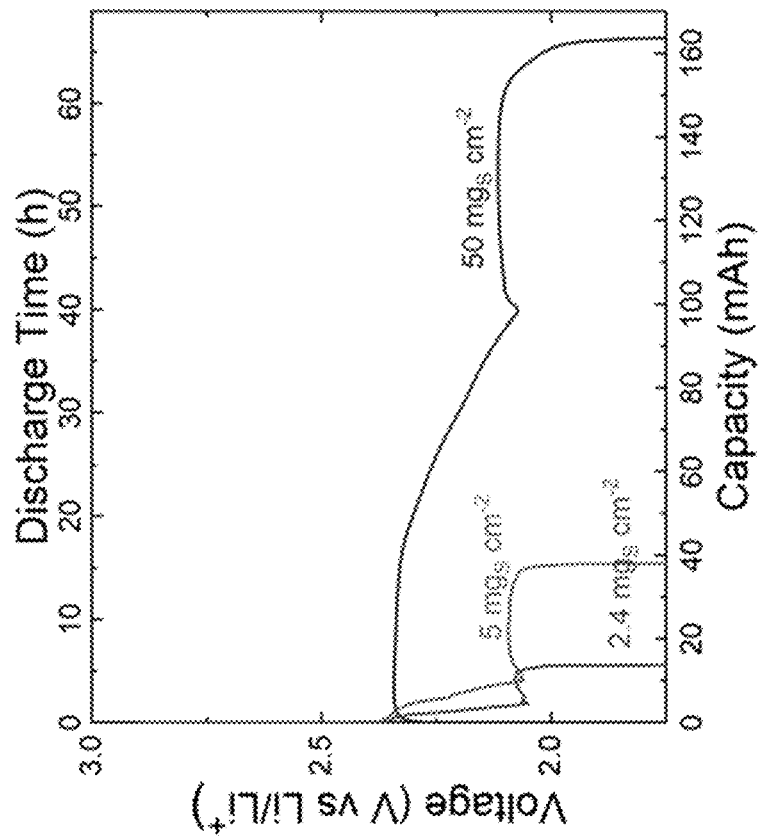
FIG. 9D shows discharge curves for low, medium, and high S loading flow cells. Li metal anode, C felt counter electrode, 1 M LiTFSI with 1 wt. % LiNO$_3$ in 1:1 DOL:DME cycled at 0.5 mA cm$^{-2}$.
Figure 9C:
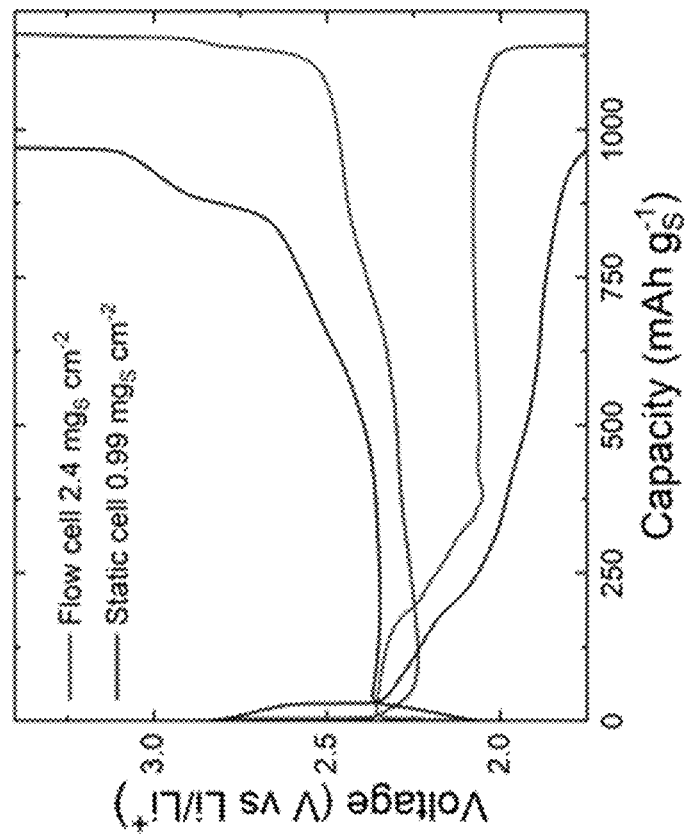
FIG. 9C shows 2$^{nd}$ cycle charge-discharge curves for the stationary cell and low S loading flow cell.

As shown in FIG. 9B, the flow cells also show improved voltage efficiency over the static cells, with the lowest S loading cell having a VE of 86.9% and CE of 97.8% over 50 cycles while the static cell had an 81.3% VE and 98.8% CE. This is due to the decrease in overpotential afforded by increased mass transport for the flow cells compared to the static cells, as shown in FIG. 9C.

As described above, one benefit of the flow cell design is the ability to increase the active material content without the limitation of diffusion through a film. To examine the impact of higher S loadings on cell performance, the S loading was increased from 2.4 mg cm$^{-2}$ to 5 mg cm$^{-2}$. As shown in FIG. 9D, this increased the maximum achieved capacity from 13.7 mAh to 9.0 mAh, increasing the percentage of S utilized from 68% to 69%. This is in contrast to traditional cathodes which tend to show decreased active material utilization at higher loadings. See J. Wu et al., *Adv. Mater.* 33(26), e2101275 (2021). The higher S loading does, however, show faster capacity fade than the lower S loading or the static cell. Further increasing the S loading to 50 mg cm$^{-2}$ increased the capacity to 164 mAh on the first cycle and discharge time to over 60 h, as shown in FIG. 9D. The long discharge time is ideal for long duration storage and shows the viability of this technology for long duration energy storage; however, long term cycling of these high S loading cells is impractical at lab scale as it takes a month to run five cycles.

The faster capacity fade seen in the 5 mgs cm$^{-2}$ cell compared to the 2.4 mgs cm$^{-2}$ cell is attributed primarily to the longer discharge time needed for the higher capacity cell. With longer discharge time there is more time for PS shuttling to occur and for solvent to evaporate from the connections between the tubing and cell parts. Both are issues that can be solved with further optimization of the cell design. Increasing the current applied would reduce the cycle time and is an important step in improving this system. However, increasing the current causes Li metal to deposit in higher surface area structures. This increases the Li available to react with PSs and electrolyte may increase the capacity fade and electrolyte consumption and cause poor cycling performance.

These results imply that the fundamental Li—S chemistry and novel SEI engineering strategies can be adapted to a hybrid redox flow battery architecture. Increasingly higher S loadings are necessary for this chemistry to realize its true promise, but such loadings require excessive cycling times at lab scale. The performance of these cells can be further increased with optimization of the cell design and Li anode. This can be done by improving the uniformity of the flow field, which should improve the contact between the catholyte and carbon counter electrode and promote more uniform Li deposition on the Li anode.

Increasing the effective surface area of the Li anode by using a 3D scaffold can also improve the uniformity of the Li deposition as well as enabling cycling at faster charge rates and enable even higher S loadings The present invention has been described as a mediated metal-sulfur flow battery for grid-scale energy storage. It will be understood that the above description is merely illustrative of the applications of the principles of the present invention, the scope of which is to be determined by the claims viewed in light of the specification. Other variants and modifications of the invention will be apparent to those of skill in the art.

We claim:
1. A mediated metal-sulfur flow battery, comprising:
a catholyte reservoir for storing an energy storage material comprising sulfur;
an electrochemical cell comprising
a metal anode, and
a cathode compartment comprising a cathode electrode and a catholyte comprising a first redox mediator and a second redox mediator, wherein the first and sec- ond redox mediators comprise metallocenes, and a salt of the anode metal ion in a solvent;

a solid-electrolyte interface on the metal anode that allows passage of metal ions while preventing passage of the first and second redox mediators; and a pump or a gravity feed for flowing the catholyte through the catholyte reservoir and the electrochemical cell, wherein the first redox mediator is oxidized and correspondingly reduces sulfur in the catholyte reservoir, and the oxidized first redox mediator is reduced at the cathode electrode during a discharge cycle; and wherein the second redox mediator is oxidized at the cathode electrode, and the oxidized second redox mediator is reduced and correspondingly oxidizes the reduced sulfur in the catholyte reservoir during a charge cycle.

2. The mediated metal-sulfur flow battery of claim 1, wherein the metal anode comprises lithium.

3. The mediated metal-sulfur flow battery of claim 2, wherein the solid-electrolyte interface is preconditioned in a solution comprising lithium iodide.

4. The mediated metal-sulfur flow battery of claim 2, wherein the salt comprises bis(trifluoromethanesulfonyl)imide.

5. The mediated metal-sulfur flow battery of claim 2, wherein the catholyte further comprises lithium nitrate.

6. The mediated metal-sulfur flow battery of claim 1, wherein the metal anode comprises sodium, potassium, magnesium, or calcium.

7. The mediated metal-sulfur flow battery of claim 1, wherein the cathode electrode comprises porous carbon, carbon paper, or carbon felt.

8. The mediated metal-sulfur flow battery of claim 1, wherein the first redox mediator comprises cobaltocene and the second redox mediator comprises decamethylferrocene.

9. The mediated metal-sulfur flow battery of claim 1, wherein the concentration of each of the redox mediators in the solvent is less than 1000 mM.

10. The mediated metal-sulfur flow battery of claim 1, wherein the concentration of each of the redox mediators in the solvent is less than 100 mM.

11. The mediated metal-sulfur flow battery of claim 1, wherein the redox potentials of the first and second redox mediators are within 500 mV of the redox potential of sulfur.

12. The mediated metal-sulfur flow battery of claim 1, wherein the solvent comprises a mixture of 1,3-dioxolane and dimethyl ether.

13. The mediated metal-sulfur flow battery of claim 1, wherein the solvent comprises a glyme, ionic liquid, or carbonate-based electrolyte.

* * * * *